United States Patent
Yie et al.

(10) Patent No.: US 9,608,748 B2
(45) Date of Patent: Mar. 28, 2017

(54) METHODS OF TRANSMITTING AND RECEIVING A MEDIA INFORMATION FILE FOR HTTP STREAMING

(75) Inventors: Chungku Yie, Incheon (KR); Min Sung Kim, Anyang-si (KR); Ul Ho Lee, Hwaseong-si (KR)

(73) Assignee: HUMAX CO., LTD., Yongin (KR)

( * ) Notice: Subject to any disclaimer, the term of this patent is extended or adjusted under 35 U.S.C. 154(b) by 492 days.

(21) Appl. No.: 13/819,599

(22) PCT Filed: Aug. 29, 2011

(86) PCT No.: PCT/KR2011/006362
§ 371 (c)(1),
(2), (4) Date: Feb. 27, 2013

(87) PCT Pub. No.: WO2012/030120
PCT Pub. Date: Mar. 8, 2012

(65) Prior Publication Data
US 2013/0166770 A1    Jun. 27, 2013

(30) Foreign Application Priority Data
Aug. 31, 2010   (KR) .................. 10-2010-0084833

(51) Int. Cl.
*H04L 29/06*   (2006.01)
*H04H 60/73*   (2008.01)
(Continued)

(52) U.S. Cl.
CPC ............. *H04H 60/73* (2013.01); *H04L 65/60* (2013.01); *H04L 65/602* (2013.01);
(Continued)

(58) Field of Classification Search
CPC ..... H04L 65/60; H04L 65/608; H04L 65/602; H04L 65/607; H04H 60/73; H04H 20/93;
(Continued)

(56) References Cited

U.S. PATENT DOCUMENTS

| 7,548,565 B2 | 6/2009 | Sull et al. |
| 2009/0034652 A1 | 2/2009 | Song et al. |

(Continued)

FOREIGN PATENT DOCUMENTS

| CN | 101193273 A | 6/2008 |
| CN | 101282348 A | 10/2008 |

(Continued)

OTHER PUBLICATIONS

Extended European Search Report for corresponding EP Patent Application No. 11822095.3, issued Apr. 1, 2015.
(Continued)

*Primary Examiner* — Abdulkader M Alriyashi

(57) ABSTRACT

Disclosed are methods of transmitting and receiving media information file for HTTP stream. Content is divided into segments, the segments are divided into segment sub groups, each of the divided segments grouping the segment sub groups, a meta media information file including information on a segment sub group is configured; and sub media information file including information on segments in a segment sub group is configured. When service initializes, the meta media information file is transmitted. When a transmission request for content is received, the sub media information file to which a playback request timing for content belongs is selected and transmitted by referring to the meta media information file, and then, a segment in a segment sub group corresponding to the sub media information file is transmitted. Thus, during HTTP streaming, initial transmission delay is reduced, and random access and trick mode playback are possible.

10 Claims, 7 Drawing Sheets

(51) Int. Cl.
*H04N 21/2343* (2011.01)
*H04N 21/438* (2011.01)
*H04N 21/643* (2011.01)
*H04N 21/6587* (2011.01)
*H04N 21/845* (2011.01)
*H04H 20/93* (2008.01)

(52) U.S. Cl.
CPC .......... *H04L 65/607* (2013.01); *H04L 65/608* (2013.01); *H04N 21/23439* (2013.01); *H04N 21/4384* (2013.01); *H04N 21/64322* (2013.01); *H04N 21/6587* (2013.01); *H04N 21/8456* (2013.01); *H04H 20/93* (2013.01)

(58) Field of Classification Search
CPC ......... H04N 21/23439; H04N 21/4384; H04N 21/6587; H04N 21/8456; H04N 21/64322
USPC ............................................. 709/231; 725/90
See application file for complete search history.

(56) References Cited

U.S. PATENT DOCUMENTS

| | | |
|---|---|---|
| 2009/0319563 A1 | 12/2009 | Schnell |
| 2010/0169303 A1 | 7/2010 | Biderman et al. |
| 2011/0099594 A1* | 4/2011 | Chen et al. .................... 725/105 |
| 2011/0202844 A1* | 8/2011 | Davidson .......... G06F 17/30274 715/723 |
| 2011/0302238 A1* | 12/2011 | Sood et al. .................... 709/203 |

FOREIGN PATENT DOCUMENTS

| | | |
|---|---|---|
| KR | 10-2004-0106414 A | 12/2004 |
| KR | 10-2005-0118966 A | 12/2005 |
| KR | 10-2007-0101826 A | 10/2007 |
| WO | WO 03/073767 A1 | 9/2003 |

OTHER PUBLICATIONS

Song et al., "Response to Call for Proposals on HTTP Streaming of MPEG Media Standard", 93rd MPEG Meeting; ISO/IEC JTC1/SC29/WG11), No. M17779, Jul. 2010, Geneva, Switzerland.

Fernando et al., "HTTP Streaming Solution—Response to Call for Proposal", ISO/IEC JTC 1/SC 29/WG 11, No. M17756, Jul. 2010, Geneva, Switzerland.

* cited by examiner

--Prior Art--

--Prior Art--

--Prior Art--

METHODS OF TRANSMITTING AND RECEIVING A MEDIA INFORMATION FILE FOR HTTP STREAMING

TECHNICAL FIELD

The present invention relates to a method for configuring and transmitting a media information file for HTTP streaming, and more particularly, to a method for configuring and transmitting a media information file related to multimedia content which is transmitted by HTTP streaming transmission such that initial transmission delay is reduced during HTTP streaming and random access and trick mode playback are possible.

BACKGROUND ART

Recently, advancement in mobile communication technology rapidly promotes popularization of mobile communication terminals to change lift style of people so that most of ordinary people always carries mobile communication terminals such as handheld terminals, PDAs, smartphones, etc. Mobile communication terminals allow user to access to communication networks more easily, and system sources of traditional communication systems to be efficiently distributed.

Among such techniques, a streaming service that may receive and play multimedia contents such as audio content and video content in real time through wireless content communication networks while users carrying mobile communication terminals moves is provided. The streaming service applied to a wired IPTV is provided in the form where multimedia content is combined with RTP (Real-time Transport Protocol) or RTP and MEPG-2.

However, in the case of a wireless streaming service, when the streaming service is provided in the form of RTP or in the combined form of RTP and MPEG-2, problems may be caused. First, since RTP does not support multiplexing, when multimedia content is divided into a plurality of packets and then transmitted, a plurality of ports according to the plurality of packets should be opened, and particularly, in a point where a firewall is installed, the streaming service may not normally be provided.

Secondly, RTP operates on UDP, and after UDP divides multimedia content into a plurality of packets and transmits the plurality of packets to a receiving side, UDP does not confirm whether the transmitted packets arrive at the receiving side in the correct sequence. For such a reason, loss of packet may be generated, and when the loss of packet is generated, since UDP does not retransmit the lost content packet to the receiving side, the loss of content may be caused. Therefore, in the case of mobile communication terminals such as smartphones, a method of providing the streaming service using HTTP (Hyper Text Protocol) operating on TCP is typically used. This is generally called "HTTP streaming".

HTTP is generally a protocol used for transmitting texts and images such as hyper texts. So, in the case of providing a multimedia content streaming service using HTTP at a mobile communication terminal such as a smartphone, since the volume of multimedia content is large, the streaming service may not be provided in real time. Then, description on an internal structure of a system for a HTTP streaming service will be made in more detail with reference to FIG. 1.

FIG. 1 is a block diagram schematically illustrating an internal structure of a system for a HTTP streaming service in a multimedia system.

Referring to FIG. 1, the system for a HTTP streaming service may be configured to include a server 101 and a client, or may be configured to further include a storing unit 103 and a buffer 104. The server 101 may divide multimedia content for streaming into a plurality of segments having the same size or different sizes. First, a case where the server 101 divides multimedia content into a plurality of segments for streaming in the same size will be described. The server 101 may generate and store a plurality of segments by dividing multimedia content for streaming in the unit of 2 seconds. At this time, the same multimedia content may have different versions according to the type of bit transmission rate, resolution, encoding codec, etc., which may be expressed as "representation".

For example, when there exists a version in which a playback time of multimedia content is 90 minutes, and bit transmission rate corresponding to content information is 75 kbps, 150 kbps or 300 kbps, the server 101 may divide the multimedia content having the playback time of 90 minutes into 2700 segments by dividing the multimedia content in the unit of two seconds according to the respective versions. Since the 2700 segments may have different versions according to the types of bit transmission rate, resolution, and encoding codec, the server 101 divides the multimedia content into total 8100 segments.

Secondly, a case where the server 101 divides multimedia content into a plurality of segments for streaming in different sizes will be described. For example, when there exists a version in which a playback time of multimedia content is 90 minutes, and bit transmission rate corresponding to content information is 75 kbps, 150 kbps or 300 kbps, the server 101 may divide the multimedia content into a plurality of segments by dividing the multimedia content in unit of 2 seconds during a playback period of from 0 to 3 minutes, and may divide the multimedia content into a plurality of segments by dividing the multimedia content in unit of 4 seconds during a playback period of from 3 minutes to 4 minutes.

The server 101 which has divided the multimedia content into a plurality of segments assigns URL information to the plurality of divided segments, stores the assigned URL information on each of the plurality of divided segments in a media information file, and then transmits the stored URL information to a client 102. At this time, the media information file may be called various names, such as "MPD (Media Presentation Description)", "Manifest file" or the like according to the standardization organization which standardizes HTTP streaming.

The server 101 may sense that the client 102 initiates a streaming service. In the case where the server 101 senses that the client 102 initiates a streaming service, the server 101 transmits the media information file storing the URL information on the segments to the client 102 through a buffer 104. The server 101 receives a segment transmission request message by the client 102, receives segments corresponding to the segment URL information included in the segment transmission request message from the storing unit 103, and transmits the received segments. Herein, the segment transmission request message includes information used for retrieving a segment, for example, URL information and version.

The client 102 may initiate a streaming service. In the case where the client 102 initiates a streaming service, the client 102 receives the media information file including URL information on segments from the server 101. Also, the client 102 may sense a network transmission environment and may transmit to the server 101 the segment request message requesting a segment to be outputted according to the network transmission environment. At this time, the client 102 transmits to the server 101 the URL information of a segment intended to output, in a state that the URL information is included in the segment request message.

The storaging unit 103 receives the segments divided by the server 101 and stores the received segments in corresponding to content information and time. Also, when the server 101 receives a segment request message from the client 102, the storaging unit 103 retrieves a segment corresponding to the received URL to the server 101. When the server 101 divides multimedia content into predetermined periods that are the same as or different from each other and then stores the divided periods in the storing unit 103 for a HTTP streaming service, description on an internal structure of the storing unit 103 will be made in more detail with reference to FIGS. 2 and 3.

FIG. 2 is a block diagram illustrating an example that multimedia content is divided into a plurality of segments having the same size for a HTTP streaming service and then stored, and FIG. 3 a block diagram illustrating an example that multimedia content is divided into a plurality of segments in different sizes for a HTTP streaming service and then stored.

The server 101 may divide multimedia content for streaming into a plurality of segments in the same size or different sizes. First, a case where the server 101 divides multimedia content into a plurality of segments for streaming in the same size will be described with reference to FIG. 2. For example, when there are versions of multimedia content in which a playback time of the multimedia content is 90 minutes, bit transmission rates corresponding to content information are 500 kbps, 1 Mbps and 2 Mbps, and resolutions are SD, 720P, and HD, the server 101 may divide the multimedia content having the playback time of 90 minutes into 2700 segments by dividing the multimedia content in unit of 2 seconds according to the respective versions.

That is, the segments including content of from 0 to 2 seconds consist of a segment 203 having a bit transmission rate of 500 kbps and a resolution of SD, a segment 204 having a bit transmission rate of 1 Mbps and a resolution of 720P, and a segment 205 having a bit transmission rate of 2 Mbps and a resolution of HD, and the remaining segments may be divided in unit of 2 seconds into total 2700 segments. That is, the server 101 generates segments proportional to the number of versions according to the content information, respectively. Therefore, in the case where URL information corresponding to the large amount of segment is included in a media information file, the size of the media information file becomes large and thus the media information file may not be provided to the client 102 in a rapid speed.

Secondly, a case where the server 101 divides multimedia content into a plurality of segments for streaming in different sizes will be described with reference to FIG. 3. For example, when there are versions of multimedia content in which a playback time of the multimedia content is 90 minutes, bit transmission rates corresponding to content information are 500 kbps, 1 Mbps and 2 Mbps, and resolutions are SD, 720P, and HD, the server 101 may divide the multimedia content having the playback time of 90 minutes into 2700 segments by dividing the multimedia content in unit of 2 seconds according to the respective versions.

That is, the segments including content of from 0 to 3 seconds consist of a segment 303 having a bit transmission rate of 500 kbps and a resolution of SD, a segment 304 having a bit transmission rate of 1 Mbps and a resolution of 720P, and a segment 305 having a bit transmission rate of 2 Mbps and a resolution of HD, and the segments including content of from 3 seconds to 5 seconds consist of a segment having a bit transmission rate of 500 kbps and a resolution of SD, a segment 306 having a bit transmission rate of 1 Mbps and a resolution of 720P, and a segment 307 having a bit transmission rate of 2 Mbps and a resolution of HD.

That is, the server 101 generates segments proportional to the number of versions according to the content information. Therefore, in the case where URL information corresponding to the large amount of segment is included in a media information file, the volume of the media information file becomes large and thus the media information file may not be provided to the client 102 in a rapid speed.

The client 102 may initiates a streaming service. In the case where the client 102 initiates a streaming service, the client 102 receives the media information file including URL information on segments from the server 101. At this time, when a network transmission environment between the server 101 and the client 102 is not good, a downloading time of the media information file from the server 101 by the client 102 is long, and thus an initial transmission delay is caused until the playback start point.

Also, when the volume of the media information file received from the server 101 by the client 102 is large, the receiving time is long and thus content at the point when the content is not yet received may not be played, so that the content may not be played in a fast forward mode, a skip mode, or the like. Moreover, as the playback time of multimedia content for streaming is lengthened, i.e., the volume of multimedia content increases, the number of divided segments increases, thus a large volume of storing unit capable of a large amount of segments is required, and the use of the large volume of storing unit requires high production costs in configuring the system.

DISCLOSURE

Technical Problem

To solve the above-mentioned problems, an object of the present invention is to provide a method for configuring and transmitting a media information file related to multimedia content which is transmitted by an HTTP streaming transmission, the method reducing initial transmission delay, and making it possible to perform random access and trick mode playback.

To solve the above-mentioned problems, another object of the present invention is to provide a method for configuring and receiving a media information file related to multimedia content which is transmitted by an HTTP streaming transmission, the method reducing initial transmission delay, and making it possible to perform random access and trick mode playback.

Technical Solution

To accomplish the above-mentioned first object of the present invention, a method for configuring and transmitting a media information file related to multimedia content which is transmitted by an HTTP streaming transmission, the method according to an embodiment of the present invention includes the steps of: dividing the multimedia content into a plurality of segments, dividing the plurality of segments into a plurality of segment sub groups, each of the plurality of divided segments grouping the plurality of segment sub group, configuring a meta media information file including information on a segment sub group, and configuring a sub media information file including information on a plurality of segments in a segment sub group; when a transmission request for content is received, selecting the sub media information file to which a playback request point for content belongs and transmitting the selected sub media information file by referring to the meta media information file; and transmitting a segment in a segment sub group corresponding to the sub media information file by referring to the sub media information file.

To accomplish the above-mentioned second object of the present invention, a method for receiving a media information file related to multimedia content which is transmitted by an HTTP streaming transmission, the method according to an embodiment of the present invention includes the steps of dividing the multimedia content into a plurality of segments, dividing the plurality of segments into a plurality of segment sub groups, each of the plurality of divided segments grouping the plurality of segment sub group, and the receiving a media information file is performed using a meta media information file including information on the segment sub group and a sub media information file including information on the plurality of segments which belong to the segment sub group; the method including the steps of: receiving the meta media information file; when a playback request for a specific point is received, receiving a sub media information file corresponding to a playback period of the specific point on the basis of the meta media information file; receiving URL information on a segment which has to be played in the sub media information file; and receiving and outputting a segment corresponding to the URL information.

Advantageous Effects

When the methods for transmitting and receiving a media information file for HTTP streaming according to the present invention are used, during HTTP streaming, initial transmission delay is reduced, and random access and trick mode playback are possible.

MODE FOR INVENTION

Figure 1:
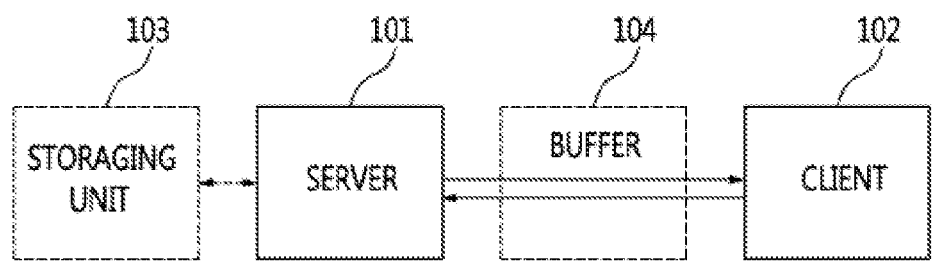
FIG. 1 is a block diagram schematically illustrating an internal structure of a system for a HTTP streaming service.
Figure 2:
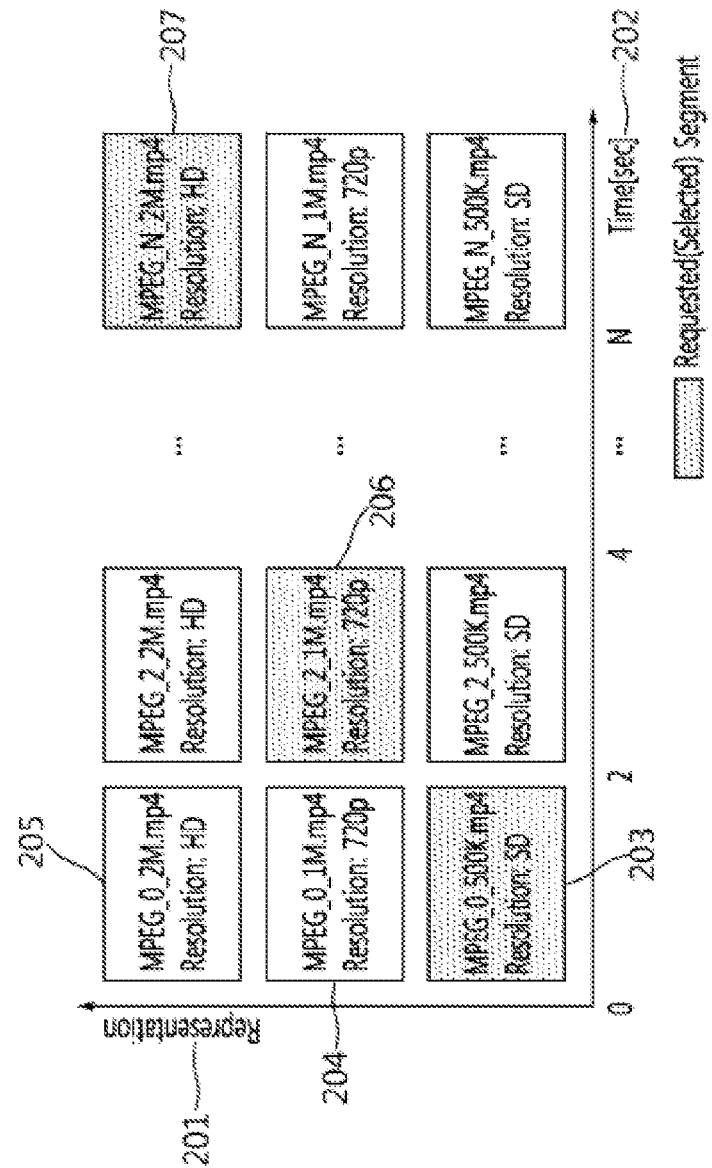
FIG. 2 is a block diagram schematically illustrating that multimedia content is divided into a plurality of segments having the same size for a HTTP streaming service and then stored.
Figure 3:
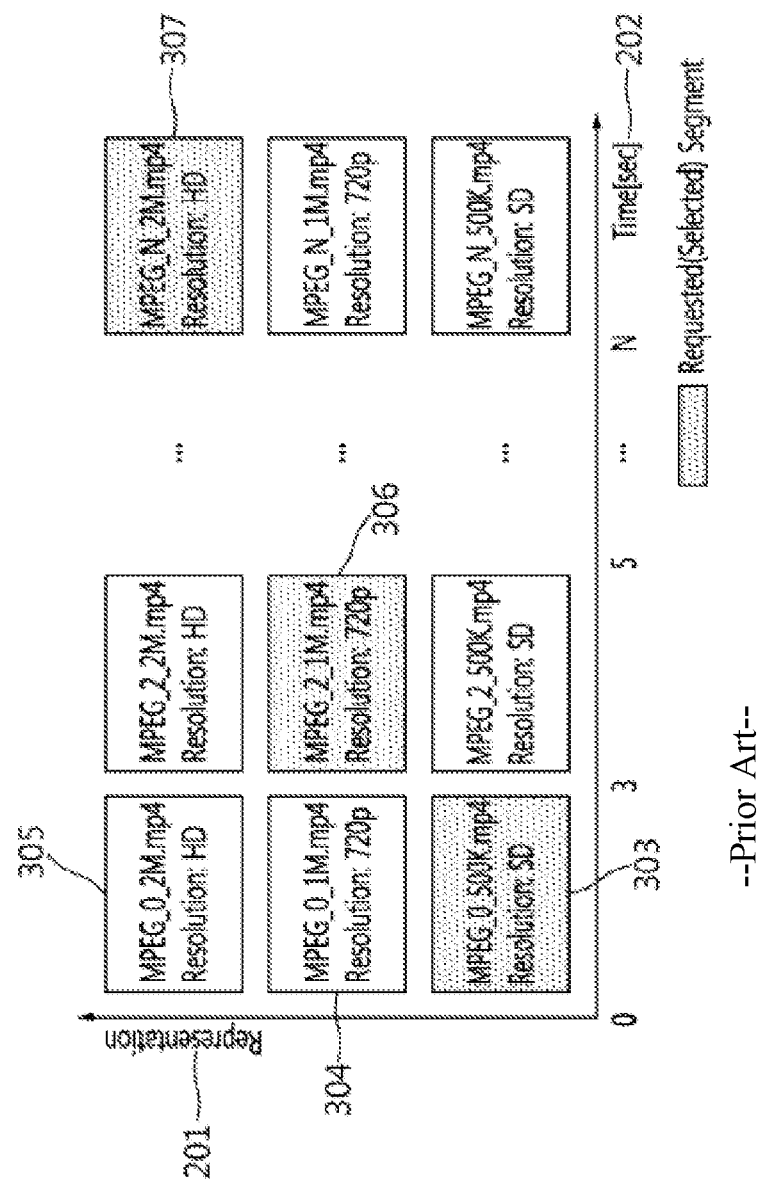
FIG. 3 is a block diagram schematically illustrating that multimedia content is divided into a plurality of segments having different sizes for a HTTP streaming service and then stored.

The present invention may be modified in various ways and may have several exemplary embodiments. Specific exemplary embodiments of the present invention are illustrated in the drawings and described in detail in the detailed description. It should be however understood that the present invention is not limited to the specific exemplary embodiments and the present invention includes all modifications, equivalents to substitutions which fall within the spirit and technical scope of the present invention. The same reference numbers are used throughout the drawings to refer to the same or like parts.

Terms, such as the first, the second, A, and B, may be used to describe various elements, but the elements should not be restricted by the terms. The terms are used to only distinguish one element from the other element. For example, a first element may be named a second element without departing from the scope of the present invention. Likewise, a second element may be named a first element. A term 'and/or' includes a combination of a plurality of relevant and described items or any one of a plurality of related and described items.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

Terms used in this application are used to only describe specific exemplary embodiments and are not intended to restrict the present invention. An expression referencing a singular value additionally refers to a corresponding expression of the multiple number, unless explicitly limited otherwise by the context. In this application, terms, such as "comprise" or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Preferred embodiments according to the present invention will now be described in detail with reference to the accompanying drawings.

A multimedia system providing multimedia content through a HTTP streaming according to an embodiment of the present invention may be configured to include a server 101 and a client 102. At this time, a media information file may be called various names, such as "MPD", or "MF" according to the standardization organization which standardizes the HTTP streaming, and will be hereinafter referred to as a media information file.

According to an embodiment of the present invention, the server 101 may provide a streaming service to the client 102 through a wired or wireless internet technology, examples of the wireless internet technology may include WLAN (Wireless LAN), Wibro (Wireless broadband), Wimax (World Interoperability for Microwave Access), and HSDPA (High Speed Downlink Packet Access), and examples of the wired internet technology may include Ethernet, HFC (Hybrid Fiber Coax), ADSL (Assymtric Digital Subscriber Line), VDSL (Very high-data rate Digital Subscriber Line), FTTH (Fiber-to-the-home), and PCL (Power Line Communication). However, the present invention is not limited to the above-mentioned technologies.

According to an embodiment of the present invention, the client 102 is an image display for receiving multimedia content from the server 101 and playing the received multimedia content, and may be implemented by at least one of fixed terminals, such as desktop computers, IPTVs, etc., or mobile terminals, such as mobile communication terminals, navigation devices, telematics terminals, handheld multimedia players, or laptop computers.

Also, according to an embodiment of the present invention, the server 101 may include a content base storing multimedia content which is transmitted through the streaming service, and the content base may be realized by at least one storing medium selected from the group consisting of RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disc, and an optical disc. Hereinafter, a structure that multimedia content is divided into a plurality of segments having the same size or different sizes and is then stored in a multimedia system according to an embodiment of the present invention will be described in detail with reference to FIGS. 4 and 5.

Figure 4:
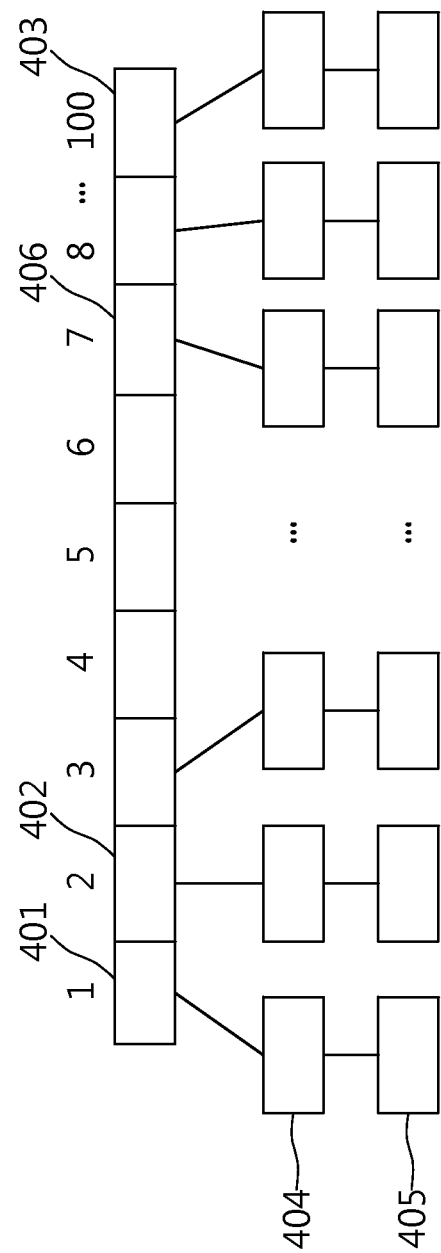
FIG. 4 is a block diagram illustrating a case that multimedia content for HTTP streaming is divided into a plurality of segments having the same size according to an embodiment of the present invention.
Figure 5:
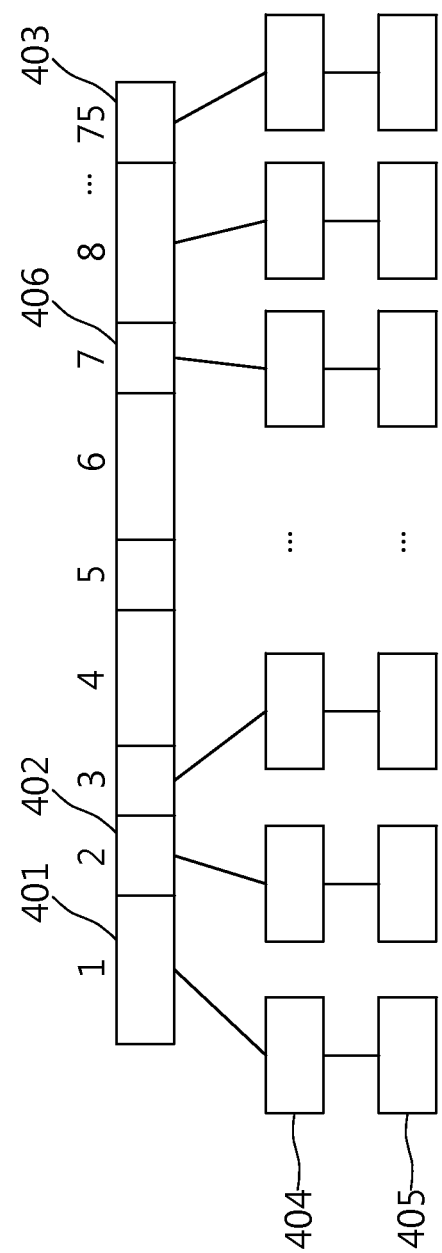
FIG. 5 is a block diagram illustrating a case that multimedia content for HTTP streaming is divided into a plurality of segments having different sizes according to an embodiment of the present invention.

FIG. 4 is a block diagram illustrating a case that multimedia content for HTTP streaming is divided into a plurality of segments having the same size according to an embodiment of the present invention, and FIG. 5 is a block diagram illustrating a case that multimedia content for HTTP streaming is divided into a plurality of segments having different sizes according to an embodiment of the present invention.

The server 101 may divide multimedia content for streaming into a plurality of segments in the same size or different sizes. First, a case where the server 101 divides multimedia content into a plurality of segments for streaming in the same size will be described with reference to FIG. 4. According to an embodiment of the present invention, when the playback time of multimedia content is 100 minutes, the server 101 may divide the multimedia content having the playback time of 100 minutes into 100 periods having a playback time of 1 minute.

The server 101 divides the multimedia content for streaming into a plurality of segments, and again divides the plurality of divided segments into a plurality of segment sub groups, each of the plurality of divided segments grouping the plurality of segment sub groups. According to an embodiment of the present invention, when a playback time of multimedia is 100 minutes, the server 101 divides the multimedia content having the playback time of 100 minutes into 100 periods having a playback time of 1 minute, and divides a segment of a first period 401 from among the 100 periods, i.e. the segment of the playback period of 0 to 1 minute, into a plurality of segment sub groups, wherein each segment sub group has a playback time of 2 seconds. Each of the remaining 99 periods 402, . . . ,406, . . . ,403 as well as the first period 401 is also divided into segment sub groups, each grouping segment corresponding to a predetermined playback period.

Secondly, a case where the server 101 divides multimedia content into a plurality of segments for streaming in different sizes will be described with reference to FIG. 5. According to an embodiment of the present invention, when a playback time of multimedia is 100 minutes, the server 101 may divide the multimedia content having the playback time of 100 minutes into 50 periods having a playback time of 1 minute and 25 periods having a playback time of 2 minutes, i.e., total 75 periods.

The server 101 divides the multimedia content for streaming into a plurality of segments, and again divides the plurality of divided segments into a plurality of segment sub groups, each of the plurality of divided segments grouping the plurality of segment sub groups. According to an embodiment of the present invention, when a playback time of multimedia is 100 minutes, the server 101 may divide the multimedia content having the playback time of 100 minutes into 50 playback periods corresponding to periods having a playback time of 1 minute and 25 playback periods having a playback time of 2 minutes, total 75 playback periods, and may again divide a segment of a first period 401 from among 75 playback periods, i.e. the segment corresponding to a playback time of from 0 to 2 minutes, into a plurality of segment sub groups, wherein each segment sub group has a playback time of 2 seconds. Each of the remaining 74 periods as well as the first period 401 is also divided into a plurality of segment sub groups, each grouping segment corresponding to a predetermined playback period.

The server 101 configures a meta media information file including information on a plurality of segments which belong to any of the plurality of segment sub groups. The meta media information file includes URL information which designates a sub media information file including information on segment sub groups corresponding to the N periods obtained by dividing a total playback time of multimedia content into N periods (where N is a natural number). According to an embodiment of the present invention, the server 101 divides multimedia content having a playback time of 90 minutes into 40 playback periods having a playback time of 2 minutes and 10 playback periods having a playback time of 1 minute, and assigns URL information designating a sub media information file corresponding to each of the 50 playback periods to configure a meta media information file.

Also, the server 101 configures a meta media information file including information on a plurality of segments which belong to any of the plurality of segment sub groups. Herein, the sub media information file includes URL information respectively designating the plurality of segment files included in the corresponding segment sub group. According to an embodiment of the present invention, the server 101 divides multimedia content having a playback time of 90 minutes into 40 playback periods having a playback time of 2 minute and 10 playback periods having a playback time of 1 minutes, again divide a segment of a first period 501, i.e. the segment corresponding to a playback time of 0 to 2 minutes, into a plurality of segment sub groups each of which has a playback time of 2 seconds, and assigns URL information respectively designating the segment files corresponding to the periods having the playback time of 2 seconds, included in the plurality of segment sub groups, to thereby configure a meta media information file.

The server 101 may sense that the client 102 initiates a streaming service. When the server 101 senses initiation of the streaming service, the server 101 transmits the meta media information file and the sub media information file corresponding to the first period. According to an embodiment of the present invention, when the server 101 senses that the client 102 has initiated the streaming service, the server 101 transmits the meta media information files 401, 402, . . . ,406, . . . ,403 and the sub media information file corresponding to the first period 401 of the meta media information files 401, 402, . . . ,406, . . . ,403 to the client 102.

Also, when the server 101 receives a transmission request for multimedia content from the client 102, the server 101 selects and transmits the sub media information files to which the playback request point for the multimedia content belongs by referring to the meta media information files, and transmits the segments in the segment sub group corresponding to the sub media information file by referring to the sub media information files. According to an embodiment of the present invention, multimedia content having a playback time of 10 minutes is divided into 10 playback periods each having a playback time of 1 minute, the divided 10 playback periods are assigned with URL to configure meta media information files, each of the segments each having a playback time of 1 minute is divided into a plurality of segment sub groups each having a playback time of 2 seconds and the divided segment sub groups are assigned with URL to configure sub media information files. When the server 101 receives a playback request point of 5 minutes and 15 seconds from the client 102, the server 101 selects and transmits the sub media information files corresponding to the playback periods of from 5 minutes and 00 second to five minutes and 99 seconds by referring to the meta media information files, and transmits the segments within the segment sub group corresponding to the sub media information files including URL information of playback periods of from 5 minutes and 14 seconds to 5 minutes and 15 seconds, for example, the segments corresponding to playback periods of from 5 minutes and 00 second to 5 minutes and 99 seconds.

The client 102 may initiates a streaming service. In the case where the client 102 initiates a streaming service, the client 102 receives the media information files from the server 101. According to an embodiment of the present invention, in the case where after multimedia content having a playback time of 10 minutes is divided into 10 playback periods each a playback time of 1 minute, the divided 10 playback periods are assigned with URLs to configure a meta media information file, a period having a playback time of 1 minute is divided into a plurality of segment sub groups each having a playback time of 2 seconds and then the divided segment sub groups are assigned with URLs to configure a sub media information file, the client 102 receives the meta media information file having URL information corresponding to each of the divided 10 periods from the client 102.

Also, the client 102 may receive segments corresponding to a playback period of a specific time from the server 101. According to an embodiment of the present invention, when segments corresponding to a playback period intended to output are not received, the client 102 receives a sub media information file corresponding to a playback period of a specific time on the basis of the meta media information file from the server 101, receives the URL information of segments which have to be played in the sub media information file, and receives and outputs segments corresponding to the received URL information.

According to an embodiment of the present invention, in the case where multimedia content having a playback time of 10 minutes is divided into a plurality of segments each having a playback time of 1 minute, the divided segments are assigned with URLs to configure a meta media information file, segments corresponding to a first period, for example, segments corresponding to a playback period of from 0 to 59 seconds are grouped and divided into a plurality of segment sub groups and the divided segment sub groups are assigned with URLs to configure a sub media information file, while the client 102 receives and outputs segments corresponding to a playback time of 2 minutes and 3 seconds from the server 101, the client 102 intends to output a segment corresponding to 4 minutes and 2 seconds, the client 102 receives the sub media information file corresponding to the playback time of 4 minutes and 2 seconds from the server 101, receives URL information of segments which has to be played in a file which has to be played in the sub media information file, receives and outputs segments corresponding to the received URL information, thereby capable of outputting the segments corresponding to a playback period of a specific time, i.e., the segments corresponding to 4 minutes and 2 seconds. A method of transmitting a media information file including information related to multimedia content for HTTP (hypertext transfer protocol) streaming according to an embodiment of the present invention will be now described in more detail with reference to FIG. 6.

Figure 6:
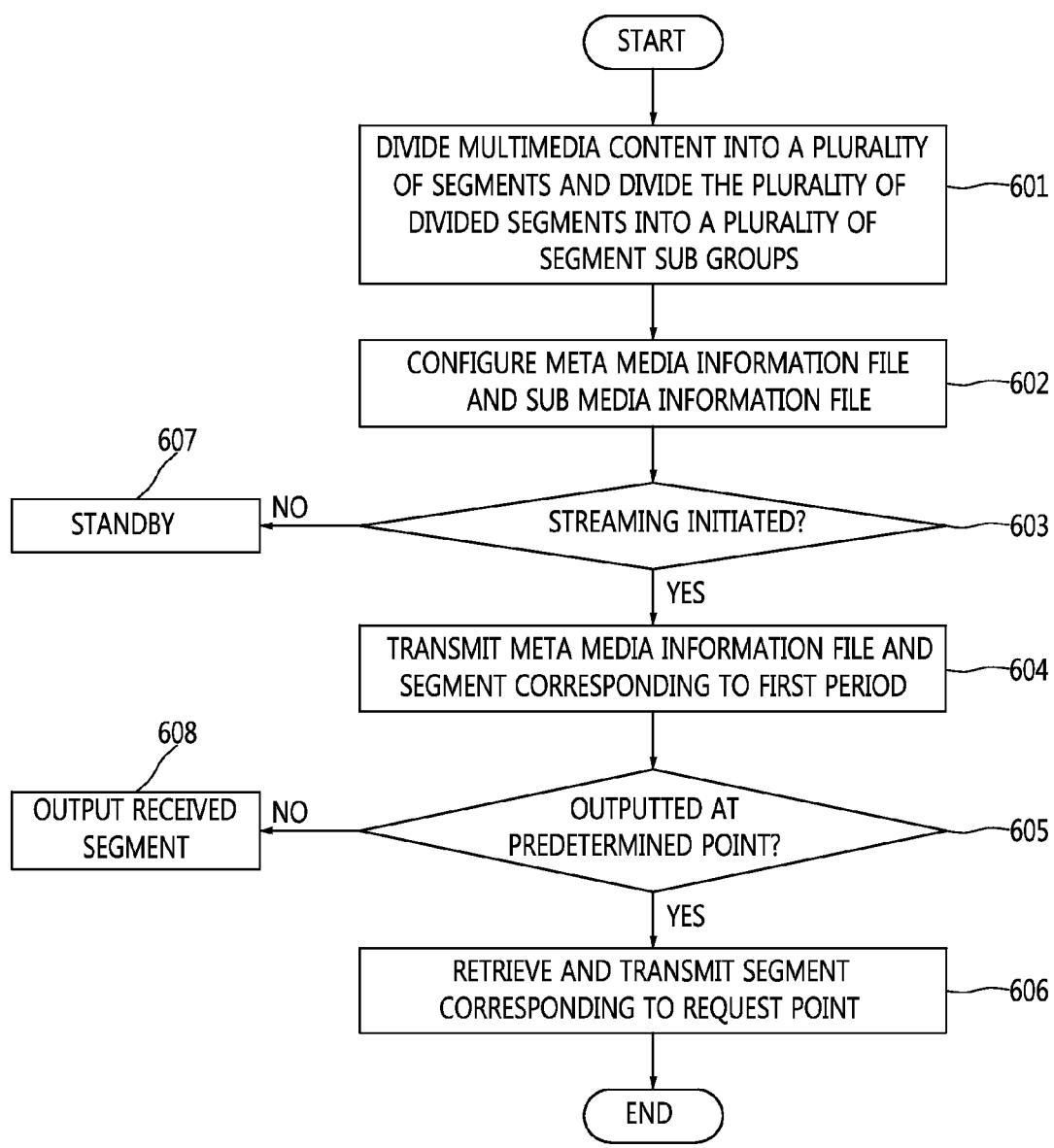
FIG. 6 is a flow diagram illustrating a method for transmitting a media information file including information related to multimedia content for HTTP streaming according to an embodiment of the present invention.

FIG. 6 is a flow diagram illustrating a method for transmitting a media information file including information related to multimedia content for HTTP (hypertext transfer protocol) streaming according to an embodiment of the present invention.

Referring to FIG. 6, the server 101 divides multimedia content for streaming into a plurality of segments in the same size or different sizes, and again divides the plurality of divided segments into a plurality of segment sub groups, each of the plurality of divided segments grouping the plurality of segment sub groups(601). More concretely, the server 101 may divide multimedia content for streaming into a plurality of segments in the same size or different sizes. First, a case where the server 101 divides multimedia content for streaming into a plurality of segments, and again divides the plurality of divided segments into a plurality of segment sub groups, each of the plurality of divided segments grouping the plurality of segment sub groups will be described. According to an embodiment of the present invention, when the playback time of multimedia is 100 minutes, the server 101 divides the multimedia content having the playback time of 100 minutes into 100 playback periods each having a playback time of 1 minute, and again divides a playback period of from 0 to 59 seconds corresponding to a first playback period, among the 100 playback periods, into 30 segment sub groups each of which has a playback time of 2 seconds.

Secondly, a case where the server 101 divides multimedia content into a plurality of segments for streaming in different sizes will be described. According to an embodiment of the present invention, when the playback time of multimedia is 100 minutes, the server 101 may divide the multimedia content into 50 playback periods each having a playback time of 1 minute and 25 playback periods each having a playback time of 2 minutes, total 75 playback periods, and may also divide a playback period of from 0 to 1 minute and 59 seconds, corresponding to a first playback period into 30 segment sub groups each having a playback time of 2 seconds and 20 segment subgroups each having a playback time of 3 seconds.

The server 101 configures a meta media information file and a sub media information file (602). More concretely, the server 101 configures a meta media information file including information on the plurality of segments which belong to any of the plurality of segment sub groups. The meta media information file includes URL information which designates a sub media information file including information on segment sub groups corresponding to the N periods obtained by dividing a total playback time of multimedia content into N periods (where N is a natural number). According to an embodiment of the present invention, the server 101 divides multimedia content having a playback time of 90 minutes into 40 playback periods having a playback time of 2 minutes and 10 playback periods having a playback time of 1 minute, and assigns URL information designating a sub media information file corresponding to each of the 50 playback periods to configure a meta media information file.

Also, the server 101 configures a meta media information file including information on a plurality of segments which belong to any of the plurality of segment sub groups. Herein, the sub media information file includes URL information respectively designating the plurality of segment files included in the corresponding segment sub group. According to an embodiment of the present invention, the server 101 divides multimedia content having a playback time of 90 minutes into 40 segments having a playback time of 2 minute and 10 segments having a playback time of 1 minutes, again divide a first period 401, i.e. the period corresponding to a playback time of from 0 to 2 minutes, into a plurality of segment sub groups each of which has a playback time of 2 seconds, and assigns URL information respectively designating the segment files corresponding to the periods having the playback time of 2 seconds, included in the plurality of segment sub groups, to configure a meta media information file.

When the server 101 senses that the client 102 has initiated the streaming service (603), the server 101 transmits the meta media information file and the sub media information file corresponding to the first period to the client 102 (604). If the client 102 does not initiate the streaming service (603), the server 101 stands by until the client 102 initiates the streaming service (607). According to an embodiment of the present invention, when the server 101 senses that the client 102 has initiated the streaming service, the server 101 transmits the meta media information files 401 to 403 and the sub media information files 404 and 405 corresponding to the first period 401 of the meta media information files 401 to 403 to the client 102.

Also, when the server 101 receives a transmission request for multimedia content from the client 102 (605), the server 101 selects and transmits the sub media information files to which the playback request point for the multimedia content belongs by referring to the meta media information file, and transmits the segments in the segment sub group corresponding to the sub media information file by referring to the sub media information file (606). If the server 101 does not receive the transmission request, the server 101 continues to transmit the meta media information file which is being transmitted (608).

According to an embodiment of the present invention, multimedia content having a playback time of 10 minutes is divided into 10 playback periods each having a playback time of 1 minute, the divided 10 playback periods are assigned with URL to configure meta media information files, each of the segments each having a playback time of 1 minute is divided into a plurality of segment sub groups each having a playback time of 2 seconds and the divided segment sub groups are assigned with URL to configure sub media information files. When the server 101 receives a playback request point of 5 minutes and 15 seconds from the client 102, the server 101 selects and transmits the sub media information files corresponding to the playback periods of from 5 minutes and 00 second to five minutes and 99 seconds by referring to the meta media information files, and transmits the segments within the segment sub group corresponding to the sub media information files including URL information of playback periods of from 5 minutes and 14 seconds to 5 minutes and 15 seconds, for example, the segments corresponding to playback periods of from 5 minutes and 00 second to 5 minutes and 99 seconds. Next, a method for receiving multimedia content through a HTTP (hypertext transfer protocol) streaming service according to an embodiment of the present invention will be now described with reference to FIG. 7.

Figure 7:
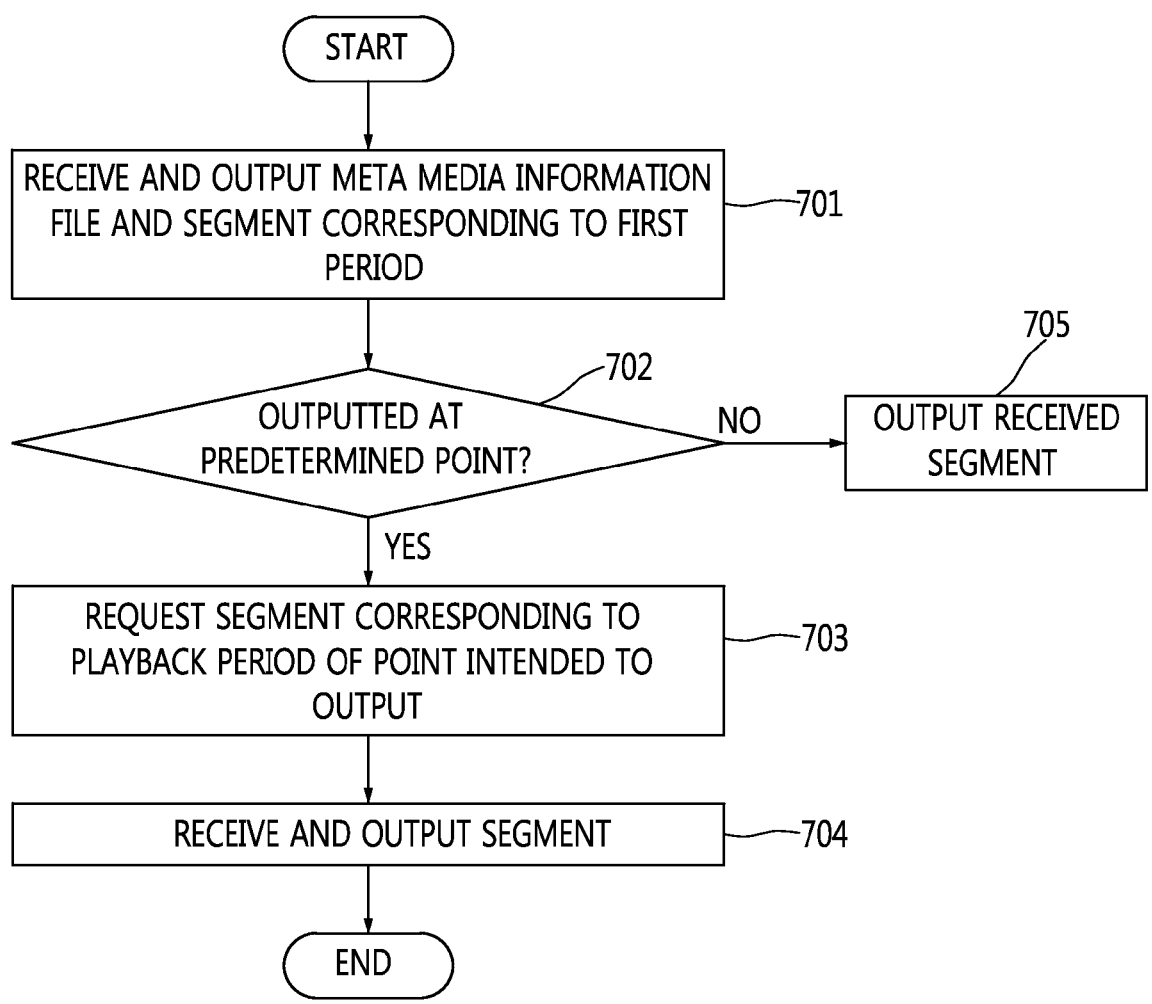
FIG. 7 is a flow diagram illustrating a method for receiving multimedia content through a HTTP streaming service according to an embodiment of the present invention.

FIG. 7 is a flow diagram illustrating a method for receiving multimedia content through a HTTP (hypertext transfer protocol) streaming service according to an embodiment of the present invention.

Referring to FIG. 7, the client 102 receives a meta media information file and a sub media information file corresponding to a first period from the server 101 (701). According to an embodiment of the present invention, in the case where after multimedia content having a playback time of 10 minutes is divided into 10 playback periods each having a playback time of 1 minute, the divided 10 playback periods are assigned with URLs to configure a meta media information file, and a period having a playback time of 1 minute is divided into a plurality of segment sub groups each having a playback time of 2 seconds and then the divided segment sub groups are assigned with URLs to configure a sub media information file, the client 102 receives the meta media information file having URL information corresponding to each of the divided 10 periods from the client 102, and the sub media information file corresponding to the first period, i.e., the period corresponding to a playback time of from 0 to 59 seconds, and sequentially receives and outputs segments corresponding to the URL information of the sub media information file, for example, 30 segments corresponding to a playback time of 2 seconds.

When the client 102 tries to output segments corresponding to a playback period of a specific time (702), the client 102 requests the segments corresponding to the playback period of the specific time to the server 101 (703) and then receives and outputs the requested segments (704). When the client 102 does not output the segments corresponding to the playback period of the specific time, the client 102 sequentially outputs segments received from the server 101 (705). More concretely, according to an embodiment of the present invention, when segments corresponding to a playback period intended to output are not received, the client 102 receives a sub media information file corresponding to a playback period intended to output using the meta media information file, receives the URL information of segments which have to be played in the sub media information file, and receives and outputs segments corresponding to the received URL information.

According to an embodiment of the present invention, in the case where after multimedia content having a playback time of 10 minutes is divided into segments each a playback time of 1 minute, the divided segments are assigned with URLs to configure a meta media information file, a segment corresponding to a first period, for example, a playback period of from 0 to 59 seconds is divided into segment sub groups, then the divided segment sub groups are assigned with URLs to configure a sub media information file, and the client 102 intends to output a segment corresponding to 4 minutes and 2 seconds while receiving a segment corresponding to a playback period of from 2 minutes and 3 seconds from the server 101 and outputting the received segment, the client 102 receives the sub media information file corresponding to 4 minutes and 2 seconds on the basis of the meta media information file, receives the URL information of the segment corresponding to 4 minutes and 2 seconds, receives and outputs segments corresponding to the received URL information, thereby capable of outputting the segment corresponding to the playback period of a specific time, i.e., the segment corresponding to 4 minutes and 2 seconds.

Although the preferred embodiments of the present invention have been described above, a person having ordinary skill in the art will appreciate that the present invention can be modified and changed in various ways without departing from the spirit and scope of the present invention which are written in the claims below.

The invention claimed is:

1. A method for transmitting multimedia content by an HTTP (hypertext transfer protocol) streaming transmission, the method comprising the steps of:
   dividing the multimedia content into a plurality of segments, dividing each of the plurality of segments into a plurality of sub segments, configuring a meta media information file including information on a first segment of the plurality of segments, and configuring a sub-media information file including information on the plurality of sub segments which belong to the first segment of the plurality of segments, wherein the information on the plurality of sub segments includes URL (uniform resource locator) information corresponding to each of the plurality of sub segments which belong to the first segment;
   when a service for the HTTP streaming transmission is initiated, transmitting the meta media information file and the sub-media information file to a client;
   when a request for a specific sub segment of the multimedia content, the request including URL information corresponding to the specific sub segment, is received from the client, transmitting the specific sub segment corresponding to the URL information in the request to the client;
   wherein the client selects a specific segment comprising the specific sub segment based on the meta media information file, and seeks the specific sub segment in the specific segment based on the sub-media information file; and
   wherein each of the plurality of segments corresponds to a specific time period divided from the multimedia content and comprises the plurality of sub segments corresponding to the specific time period.

2. The method of claim 1, wherein the multimedia content is divided into a plurality of periods based on a playback time, and the meta media information file comprises URL (uniform resource locator) information of the plurality of segments, wherein the plurality of segments respectively corresponding to the plurality of periods.

3. The method of claim 2, wherein the multimedia content is divided into the plurality of periods having same size or different sizes.

4. The method of claim 1, wherein each of the plurality of segments corresponding to a greater time period of the multimedia content than each of respective sub segments.

5. The method of claim 1, wherein configuring the sub-media information file includes generating a plurality of sub-media information files respectively corresponding the plurality of segments, and
   wherein when the request for the specific sub segment of the multimedia content is received from the client, a sub-media information file comprising the specific sub segment is retrieved based on the meta media information file, and the specific sub segment is retrieved based on the retrieved sub-media information file.

6. A method for receiving multimedia content transmitted by an HTTP (hypertext transfer protocol) streaming transmission, wherein the multimedia content is divided into a plurality of segments, each of the plurality of segments is divided into a plurality of sub segments;
   the method comprising:
   receiving, by a client, a meta media information file and a sub-media information file, wherein the meta media information file includes information on a first segment of the plurality of segments and the sub-media information file includes information on the plurality of sub segments which belong to the first segment of the plurality of segments, wherein the information on the plurality of sub segments includes URL (uniform resource locator) information corresponding to each of the plurality of sub segments which belong to the first segment;
   selecting, by the client, a specific segment based on the meta media information file;
   seeking, by the client, a specific sub segment in the specific segment based on the sub-media information file;
   transmitting, by the client, a request for the specific sub segment of the multimedia content using a respective URL information of the specific sub segment; and
   receiving and outputting, by the client, the sub segment corresponding to the respective URL information;
   wherein each of the plurality of segments corresponds to a specific time period divided from the multimedia content and comprises the the plurality of sub segments corresponding to the specific time period.

7. The method of claim 6, wherein the multimedia content is divided into a plurality of periods based on a playback time, and the meta media information file comprises URL (uniform resource locator) information of the plurality of segments, wherein the plurality of segments respectively corresponding to the plurality of periods.

8. The method of claim 7, wherein the multimedia content is divided into the plurality of periods having same size or different sizes.

9. The method of claim 6, wherein each of the plurality of segments corresponding to a greater time period of the multimedia content than each of respective sub segments.

10. The method of claim 6, wherein configuring the sub-media information file includes generating a plurality of sub-media information files respectively corresponding the plurality of segments, and
   wherein when the request for the specific sub segment of the multimedia content is received from the client, a sub-media information file comprising the specific sub segment is retrieved based on the meta media information file, and the specific sub segment is retrieved based on the retrieved sub-media information file.

* * * * *